March 24, 1970  M. AUPOIX ETAL  3,502,783
ELECTRIC CABLE FOR POLYPHASE CURRENT
Filed Nov. 30, 1967

INVENTORS
MARCEL AUPOIX
FRANÇOIS MOISSON-FRANCK-HAUSER

BY: Craig & Antonelli
ATTORNEYS

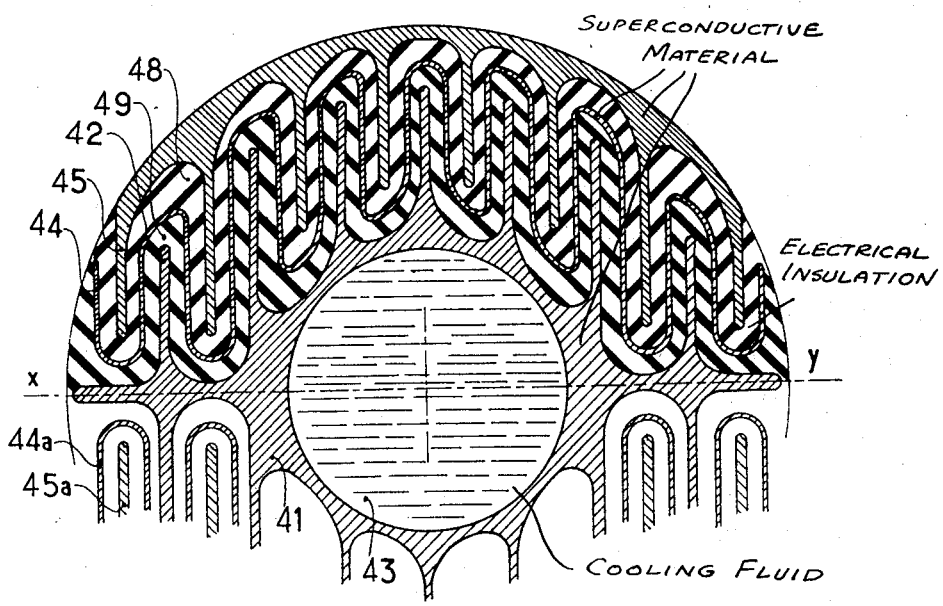
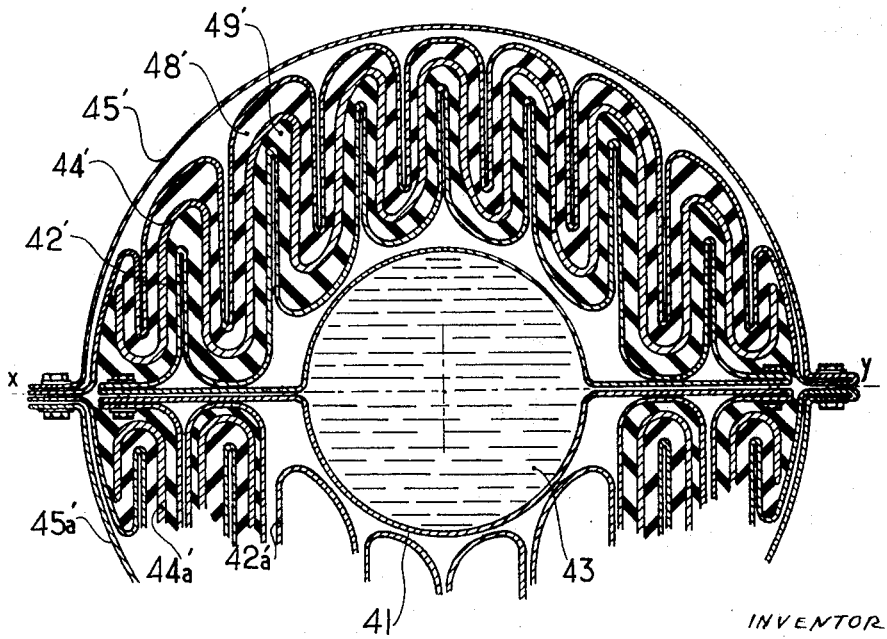

United States Patent Office 3,502,783
Patented Mar. 24, 1970

3,502,783
ELECTRIC CABLE FOR POLYPHASE CURRENT
Marcel Aupoix, Paris, and François Moisson-Franckhauser, Athis-Mons, France, assignors to Compagnie Generale d'Electricite, Paris, France, a corporation of France
Filed Nov. 30, 1967, Ser. No. 691,679
Claims priority, application France, Dec. 6, 1966, 86,719
Int. Cl. H01b 7/34
U.S. Cl. 174—15                16 Claims

ABSTRACT OF THE DISCLOSURE

Electric cable for polyphase current transmission, comprising a metal core surrounded by a plurality of radial metal ribs extending parallel to the axis of the core, and a plurality of electric conductors in the form of shaped conductive members extending parallel to the axis of the core, the distance between two adjacent conductors being substantially equal to the distance between the said core and ribs and the closest conductor thereto.

---

The present invention relates in general to conductors, and more particularly to a structure for cryogenic polyphase cables. Cables of this nature may be of the "hyper-conductive" type, or of the "super-conductive" type.

The term "hyper-conductive" is employed to describe a cable whose active part is made of a high purity metal and has its temperature lowered to between 20 and 70° Kelvin, and thereby possesses a conductivity as much as several hundred times greater than that of the same metal at ambient temperature.

The term "hyper-conductive" is employed to describe a cable in which at least certain parts are made of materials possessing super-conductive properties, that is to say, whose resistivity drops to a value substantially zero when its temperature is lowered to between 2 and 18° Kelvin, as appropriate.

In hyper-conductive cables employed at industrial frequencies, the depth of current penetration in the conductive members is limited to a fraction of one millimeter into the surfaces of the phase conductors, so that to obtain increased current carrying capacity it is necessary only to increase the circumferential length of the contour defining the section of the conductors without appreciably increasing their number or cross-sectional size.

In super-conductive cables consisting, for example, of lead, columbium or its compounds, the electrical losses may be kept to a low level if the superficial current density in the skin layer of the super-conductor is kept below a limiting value, which depends on the ability to keep the cable in the cold state.

It is an object of the present invention to produce a cryogenic cable, either of the hyper-conductive type or of the superconductive type, in which the circumferential length of the contour of each phase conductor is great in comparison with the corss-sectional area of the conductor.

The present invention consists of an electrical cable for conveying polyphase current, comprising a substantially tubular central metal section for circulating a cryogenic fluid in the same, the said central section being surrounded by a plurality of substantially plane radial fins extending parallel to the axis of the said central section, a plurality of electrical conductors numbering at least as many as the number of phases minus one, the conductors all having the form of profiled sections situated parallel to the axis in such a manner that each conductor is spaced from the others by a certain distance, and one of the conductors being spaced from the outer surface of the substantially tubular central metal section by the aforementioned distance, the other conductors of the cable being arranged in such a manner that all of the conductors provide parallel and equidistant surfaces, the distance between the aforesaid surfaces being equal to the aforesaid constant distance, and a heat insulation material being electrically insulated from the said conductors and surrounding these. The aforesaid conductors of the cable may be made of massive curved metal sheets, or else of extruded metal.

The invention will now be described with reference to the accompanying drawings, which illustrate the invention but in no restrictive sense.

FIGURE 3 illustrates the cross-section of the core of a cable according to a further modified embodiment.

FIGURE 4 illustrates the cross-section of the core of a cable according to another modified embodiment.

Figure 1:
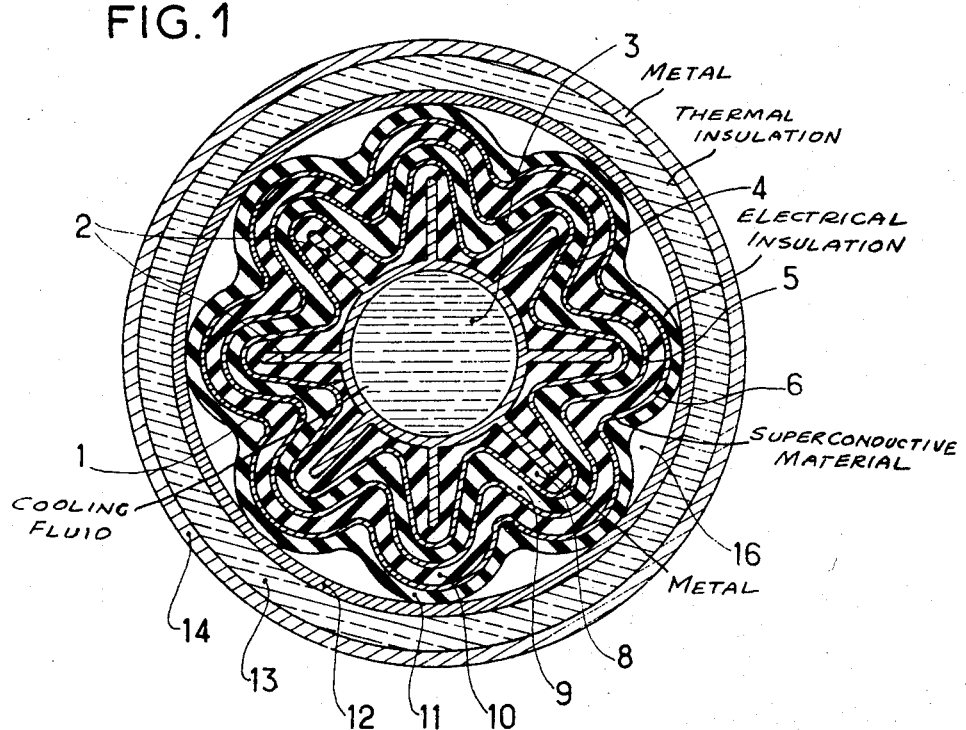
FIGURE 1 illustrates the cross-section of a cable according to a preferred embodiment.

In FIGURE 1, which illustrates the cross-section of a three-phase cable according to the invention, the central portion 1 of the cable is provided in the form of a cylindrical tube formed with radial fins 2. Eight fins have been shown, but the cable may comprise a greater or lesser number of fins without departing from the teaching of the invention.

This central portion 1 is made of metal or metal alloy whose conductivity at a temperature close to the boiling point of nitrogen under normal pressure is greater than $3.10^9$ mho/meter. Aluminum or copper may be chosen for example, and an extrusion process may be used, for example, to produce this central portion. In the case of the described embodiment wherein this portion has no electrical function, the copper or aluminum of which it may be made is of standard grade.

The inside 3 of this central portion 1 of the cable is advantageously employed for circulation of the cryogenic fluid, which may be liquid nitrogen, liquid hydrogen, gaseous helium at low temperature in the case of a hyper-conductive cable, or liquid helium in the case of a super-conductive cable.

The three conductors of the three-phase cable illustrated in FIGURE 1 consist of three metal sections 4, 5 and 6 which are contoured to accommodate the shape of the said fins. By virtue of this arrangement, the conductors conveying one phase each have large opposed surfaces compared to that occupied by a circular configuration. The conductors 4, 5 and 6 are insulated from the central portion, from each other and from the outside, by corresponding layers of electrical insulation 8, 9, 10 and 11.

In the "hyper-conductive" version of the cable, the conductors are made of any metal possessing hyper-conductive properties, such as purified aluminum, beryllium, copper of the OFHC type, or of other appropriate metal, the thickness of the conductor 5 advantageously being close to $1.1 \times d$ in order to minimize electrical losses, $d$ being the thickness of the skin layer in the metal at the operating frequency.

In the "hyper-conductive" version of the cable, the conductors may be made of lead, or of hyper-conductive metal coated with a layer of super-conductive material, by bonding, rolling or plating. In the case of the conductors 4 and 6, this super-conductive layer is situated on the surface facing towards the conductor 5, whereas a super-conductive layer is situated on both sides of the phase conductor 5. Th super-conductive materials employed may be chosen from the group consisting of lead, columbium and its compounds and alloys, such as a columbium-tin compound and columbium-sirconium and columbium-titanium alloys.

A non-continuous binding 12 secures the conductors and bears on the outer insulating layer 11. A layer of heat insulation 13 surrounds the binding 12. It is preferably made of a material or structure providing super-insulation under vacuum. Such "super-insulation" means are well known and are set forth and clearly describe in U.S. Patent No. 3,354,021, issued on Nov. 21, 1967, to Jean Royet. It is secured externally by means of a sealed external enclosure 14, made of metal for example. The spaces 16 extending between the insulating layer and the non-continuous binding 12, may be employed as passages to establish a vacuum and cryogenic conditions for the said super insulation 13, which is the reason why the binding 12 consists of a screen, netting or the like.

Figure 2:
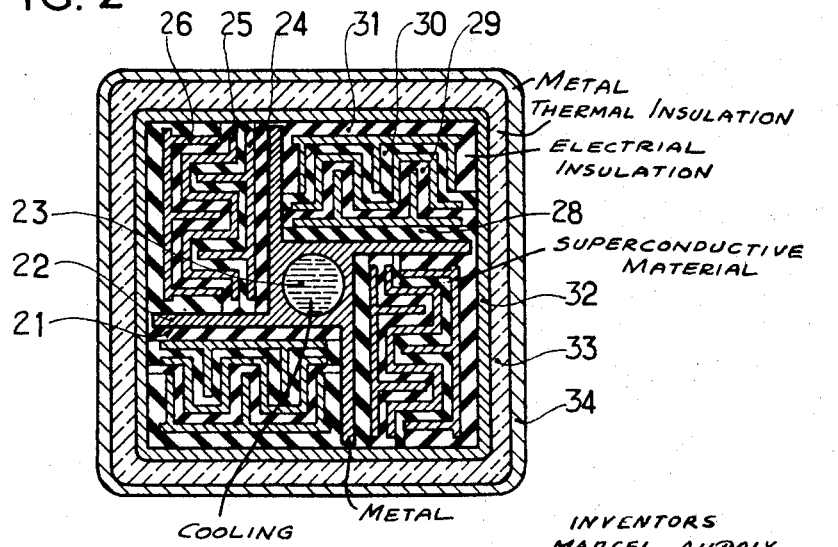
FIGURE 2 illustrates the cross-section of a cable according to a modified embodiment.

FIGURE 2 illustrates the cross-section of a cable according to a modified embodiment of the invention. The central portion 21 of the cable has a substantially square cross-section, bears four fins 22 positioned at right angles, and has a central bore 23. Three conductors 24, 25 and 26, one per phase, are situated in each of the quadrants delimited by the fins, the conductors of each phase being connected electrically in parallel at the extremities of the cable. The shape of the conductors is chosen in such a manner that they face each other with the greatest possible surface.

As apparent from FIGURE 2, the central conductor has a cross-section resembling that of a spoked wheel, and the conductors surrounding the same consist of portions situated between the spokes. The conductors are of the same nature as provided in the embodiment of FIGURE 1, and may be produced by extrusion in this instance. The cable is completed by layer of electrical insulation 28, 29, 30 and 31, a noncontinuous binding 32, a thermal super insulation layer 33 and a hermetic sheath 34, as in the preceding case. The extruded conductors shown in FIGURE 2 may be replaced by bent sheet metal conductors corresponding to those of the embodiment of FIGURE 1.

In a modified form of this embodiment and the other disclosed embodiments, the central portion 1 of the cable may be employed to convey one of the current phases. It will then be made of the same material as the surrounding conductors, and one of the phase conductors external to the central portion will then be omitted. This arrangement renders it possible to reduce the diameter of the cable for the same power. In another form of these embodiments, the central portion of the cable could also be employed as the neutral line of a three-phase cable.

FIGURE 3 illustrates the inside of a cable according to another embodiment of the invention, showing for simplicity of description only the central portion 41 and the conductors, but not the outer insulation and sheathing would naturally be provided in the completed cable. The core of the cable is employed for one of the current phases and in addition carries the cryogenic fluid. Each of the two other current phases is carried by respective conductors arranged in two corresponding symmetrical groups, each group comprising the conductors 44 and 45 and 44a and 45a, the conductors 44 and 44a, like the conductors 45 and 45a, being electrically connected in parallel, the connections being made at each extremity of the cable.

The conductors 44 and 45, made of extruded metal or of curved sheet metal, are contoured to fit precisely one into the other. The conductor 44 also fits precisely into the fins 42 of the conductor 41. This arrangement ensures simple assembly of the cable. The different conductors are insulated from each other in the same manner as in the cables previously described.

In a modified form of the embodiment of FIGURE 3, as illustrated in FIGURE 4, the conductors for the three phases each consist of two sections of bent or folded sheet metal, forming an identical perimeter in each instance to that of the corresponding conductors illustrated in FIGURE 3. The phase conductors bear the corresponding reference marks 47' and 47'a, 44' and 44'a, and 45 and 45'a. The conductors 47' and 47'a, and 45' and 45'a, are joined together along the cable in each instance, the conductors 44' and 44'a are connected electrically in parallel at the extremities of the cable.

The materials employed in the case of the embodiments of FIGURES 3 and 4 are the same as those of the cables illustrated in FIGURES 1 and 2, and the same applies in respect of the insulating layers.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:
1. A cryogenic polyphase cable comprising
   cooling means for conveying a flow of cryogenic fluid and including a centrally disposed tubular metal conduit having a plurality of metal fins,
   a plurality of electrical conductors disposed symmetrically with respect to said cooling means and having a profiled contour in cross section, said conductors being spaced from each other by a certain distance and one of said conductors being spaced from the outer surface of said cooling means by said certain distance, to form parallel equi-distant conductive surfaces, and
   a thermal super-insulation electrically insulated from and surrounding said conductors.

2. A cryogenic polyphase cable as defined in claim 1 wherein all of said fins are disposed substantially transverse to a single plane through said cooling means.

3. A cryogenic polyphase cable as defined in claim 1 wherein all of said fins extend outwardly from said conduit and are disposed tangentially thereto.

4. A cryogenic polyphase cable as defined in claim 1 wherein said fins all extend radially outwardly from said conduit.

5. A cryogenic polyphase cable as defined in claim 1 wherein one of said conductors is provided with a plurality of projectors which are interdigitated with said fins, at least one other conductor being disposed between said one conductor and said cooling means.

6. A cryogenic polyphase cable as defined in claim 1 wherein said conduit, said fins and said conductors are made of a metal having an electrical conductivity exceeding $3.10^9$ mhos/meter.

7. A cryogenic polyphase cable as defined in claim 6 wherein said metal is selected from a group essentially consisting of refined aluminum, copper of the OFHC type, and beryllium.

8. A cryogenic polyphase cable as defined in claim 7 wherein said metal is coated on at least one side by a layer of a super-conductive material chosen from the group consisting of lead, columbium-tin compound, columbium-zirconium alloy and columbium-titanium alloy.

9. A cryogenic polyphase cable as defined in claim 1 wherein said conductors are made of a metal having an electrical conductivity exceeding $3.10^9$ mhos/meter chosen from the group essentially consisting of refined aluminum, copper of the OFHC type and beryllium.

10. A cryogenic polyphase cable as defined in claim 9 wherein said conduit and said fins are made of a metal chosen from a group essentially consisting of stainless steel, iron, nickel and alloys of these metals.

11. A cryogenic polyphase cable as defined in claim 10 wherein said conductors are covered on at least one side by a layer of a super-conductive material chosen from the group essentially consisting of lead, columbium-tin compound, columbium-zirconium alloy and columbium-titanium alloy.

12. A cryogenic polyphase cable as defined in claim 1 in which at least one conductor has a thickness approximately $1.1d$, where $d$ is the thickness of the skin layer of the metal of the conductor at the frequency of the current conveyed.

13. A cryogenic polyphase cable as defined in claim 12, in which the said fins are situated radially and with uniform spacing around said conduit, the said conductors being made of a section of thin folded sheet metal, said conduit and said fins forming a single metal element.

14. A cryogenic polyphase cable as defined in claim 12, in which four fins are situated in substantially tangential direction to said conduit and at right angles to each other, said conduit and said fins forming a single metal element, said conductors being positioned in four groups of three conductors, the central conductor in each group having a crenellated section and the other two conductors possessing portions engaging in the said crenellations, the corresponding conductors in each group being connected electrically in parallel at the extremities of the said cable.

15. A cryogenic polyphase cable as defined in claim 12, in which the said fins are parallel to each other and uniformly spaced apart, said conduit and said fins forming a single metal element, two conductors being arranged in two sets symmetrical relative to a diametrical plane of the said cable, the conductor adjacent to the said central portion and to the said fins having a wavy or corrugated section and the outer conductor having protuberances which engage in the said corrugations, the corresponding conductors in the two sets being correspondingly connected electrically in parallel at the extremities of the said cable.

16. A cryogenic polyphase cable as defined in claim 12, which said fins are parallel to each other and uniformly spaced apart, said conduit and said fins being formed by two metal elements symmetrical one with respect to the other connected to each other and each formed by a metal sheet folded on itself in such manner as to delimit, on the one hand, half of a central bore and the said fins on the other hand, the said two conductors being positioned in two sets symmetrical to the plane of symmetry of the two elements, the conductor adjacent to said conduit and to the said fins having a wavy or corrugated section and the outer conductor made of bent or folded sheet metal having protuberances which engage in the said corrugations, the corresponding conductors in the two sets being electrically connected in parallel.

References Cited

UNITED STATES PATENTS

| 3,292,016 | 11/1966 | Kafka | 174—15 X |
| 3,396,551 | 8/1968 | Dimentberg | 174—15 X |

FOREIGN PATENTS 1,463,138  11/1966  France.

LEWIS H. MYERS, Primary Examiner

A. T. GRIMLEY, Assistant Examiner

U.S. Cl. X.R.

174—105, 117, 126